Feb. 27, 1934.  C. Z. SHALLIT  1,949,085
HEN'S NEST
Filed Sept. 16, 1931
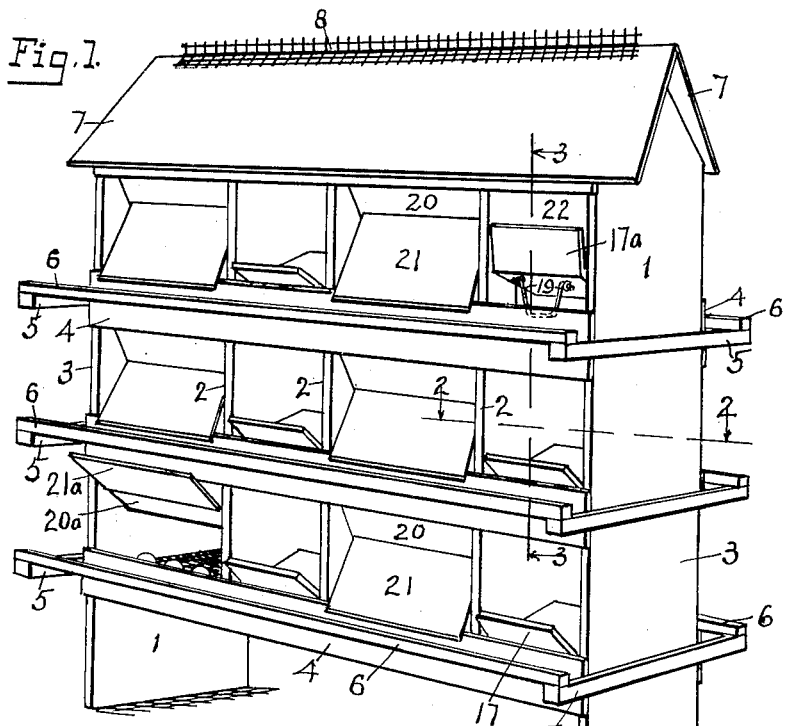
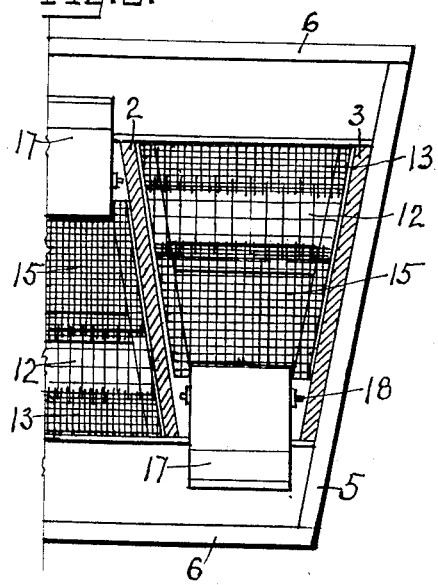
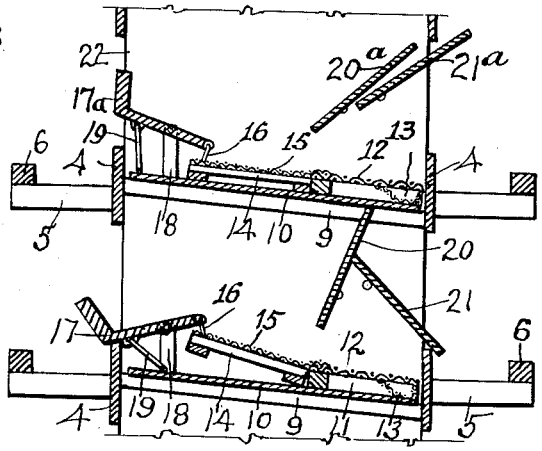
Charles Z. Shallit, Inventor,
By Geo. W. Bullard, Attorney

UNITED STATES PATENT OFFICE 1,949,085

HEN'S NEST

Charles Z. Shallit, Tacoma, Wash.

Application September 16, 1931
Serial No. 563,105

5 Claims. (Cl. 119—47)

My invention relates to improvements to hen's nests as used by poultrymen in producing eggs and fowls in quantity for the market. My invention further relates to grouping a large number of nests within one housing or inclosure in which many hens can be accommodated without disturbing one another.

The principal objects of my invention are, to keep the eggs clean after being laid to automatically remove the eggs out of the hen's reach so she cannot peck or break them to provide a way to gather the eggs without disturbing the hen while on the nest to produce a nest of such form that the hen will face the entrance door while sitting on the nest; to provide a nest in which the hen will be confined and protected from injury by other hens while she is recovering from the strain of laying the egg; to provide a means for trapping or confining the hen within the nest till let out by the poultryman who can thus keep a record of the number of eggs a hen produces within a certain period of time; to provide a hen's nest that can be removed from the nest house at any time for cleaning and disinfecting; and finally, to produce a nest that will be an article of manufacture, that can be made in quantity and shipped to the poultryman who can set them up, put them together and in place.

I attain these and other objects by means of the apparatus illustrated in the accompanying drawing, in which—

Figure 1 is a perspective of my invention in the form of a nest house with a number of hen's nests assembled therein; Fig. 2 is a horizontal section through a part of the nest house on the line 2—2 and showing a plan of the nest and the manner of locating it within the nest house; and Fig. 3 is a vertical section through a part of the nest house and more fully shows the form and construction of the newly improved nest. Fig. 4 is a front elevation of the U-shaped standard to support the trap door when closed.

Similar characters refer to similar parts in each view.

Referring to Fig. 1 of the drawing, it will be seen that the invention is shown assembled in a nest house 1 in which are provided spaces for twelve nests in three tiers of four nests each. The nest house can be made to contain more or less nests as desired and have been made to contain as many as twenty-four nests in one house. The nests are separated and inclosed by upright partitions 2 and wall ends 3, which are so spaced and set diagonally that each nest space will be approximately eight inches wide at the entrance end, fourteen inches wide at the rear end, eighteen inches deep from front to rear and twelve inches from floor to floor of each tier, as will be seen by referring to Figs. 2 and 3.

The upright wall ends and partitions are indicated framed together by means of cross pieces 4 nailed or screwed to their two edges. I do not limit myself to this form of construction, but reserve the right to use thicker pieces of wood so housed that the ends may be screwed to the wall ends only and the partitions loosely fitted to drop into and be supported within slots on the inner sides of said thicker pieces. This may be a preferable way of framing the nest house in the knock-down for shipping.

On a level with the center of the cross pieces 4 are fixed cross pieces 5 on the wall ends, each to extend some six inches out on each side of the nest house, and on the outer ends of these are fixed perch bars 6 on which hens can alight when looking for a nest. The nest house is covered with a gable roof 7 and the ridge is provided with a strip of netting of wire or other sharp pointed material 8, to prevent the hens from using the nest house as a roosting place. The nest house is now made complete by fixing supporting strips 9 on the inner side of the wall ends and on each side of the partitions to support the nest device. These strips 9 are set to an incline of approximately one and one-half inches to the rear as will be seen in Fig. 3. It will be seen from Figs. 1 and 2 that the nests in each tier are designed to front alternately on opposite sides of the nest house.

The nest device is constructed on a floor board 90 designed to rest on and be supported on the inclined strips 9. On the wide end of this floor board 10 are fixed side strips 11 on the top of which is fixed a coarse wire screen 12 to extend from side to side of the nest. A space of some two inches is left between this wire screen and rear of the nest space and below this is fixed a bag-like receptacle of burlap or other fabric. This receptacle 13 is designed to receive the eggs as they roll out from the nest and to hold them out of reach of the hen in the nest. This receptacle is not important, but is found useful with young hens. It may be omitted, if desired, and the wire screen extended over the space, the nest being made more sanitary without it. I reserve the right to use it or omit it in the making of my invention.

In front of the wire screen 12 is attached a light frame 14 which is covered with a finer wire screen 15 made to extend partly over the screen 12 and nailed to the strips 11 and thus form a hinge thereto. The front of this screened frame 14 is attached by means of a link connection 16 to the rear edge of an L-shaped trap door 17 which is pivotally mounted at its sides on upright supports 18 extending from the floor board 10. On the under side of this trap door 17 is pivotally attached a U-shaped standard 19 which slips to an upright position when the trap door is closed and supports it in the position shown in Figs. 1 and 2 at 17a. This standard 19 is detachable and is to be used for trap-nesting only, and may be removed when not wanted.

The rear of each nest is closed by means of two pivotally hung closing boards 20 and 21. The inner board 20 inclines from the top of the nest space downward and inward, leaving a space between its lower edge and the wire screen 12 sufficient for an egg to roll freely thereunder. The outer board 21 is so mounted as to partially support the inner board 20 in position and to close the lower part of the nest. Its lower edge can be lifted up and give access to the eggs for collecting the same as can be seen at 21a in Figs. 1 and 2. It also allows the nest device to be removed from the nest house for cleaning and sterilizing and to replace the same.

My invention as now described is complete and ready for the poultryman's use in providing a nesting place for his fowls. The hen in seeking a nesting place will fly up onto one of the perch bars 6 and finding an open trap door 17 will creep into the open nest. Her weight on the screened frame 14 will automatically close the door behind her and shut her in, leaving an open light space above the door as shown at 22 in Figs. 1 and 3. The nest space is purposely made narrow and tapered toward the front so a hen cannot set crosswise in the nest, so she will instinctively turn about with her head facing the light. Observation has shown that a hen will usually sit diagonally on such a form of nest with her head always toward the trap door 17a. The limited space compels the hen to keep her feet on or near the center of the wire screen 15 and the dirt that may come off the hen's feet will fall through the screen onto the nest floor 10.

It will now be seen that when an egg is laid within the newly improved nest, it will roll by gravity away from the hen and under the inner back board 20, clean and fresh to the rear of the nest out of sight and reach. This is of special value should an egg be bloodstained by a "blowout" or hemorrhage when being laid, because the hen cannot see it and peck at it and often break it as is their habit when an egg is so stained. The nest is of further value in that it confines the hen within the nest till she fully recovers from the strain or injury from delivering an egg and will not be exposed to other hens who have an eager taste for blood and will often peck hens, so injured and exposed, with fatal results.

"Trap-nesting" is attained by means of the pivotally hung U-shaped standard 19 which is designed to confine the hen till let out by the poultryman. A numbered tag is placed on the leg of each hen and a record kept of each time an egg is laid by every hen. When it is found a hen does not lay an egg often enough to be profitable, she is disposed of in the market.

It is to be observed that my invention is constructed of materials that can be readily secured, assembled and put together. The nest house is of wood usually in stock in any community. The thin wood parts of the nest can be made of 3-ply panel board so as not to crack or warp from being handled or washed with water. The construction of every part of the invention is both practical and durable.

Having described my invention, I claim:—

1. A hen's nest, including a floor board, a strip-mounted screen nest bottom on said floor board, the front part of said nest bottom made free to be slightly lifted from said floor board, a pivotally mounted trap door to said hen's nest, the front part of said nest bottom being attached to said trap door and adapted to be slightly lifted by the said trap door, said screen bottom and floor board being tapered toward said trap door, and said nest being inclosed within a nest house designed to receive, support and contain a multiple of said nests, and each nest being set to an incline from said trap door.

2. A hen's nest, including a floor board, a strip-mounted screen nest bottom on said floor board, the front part of said nest bottom made free to be slightly lifted from said floor board, a pivotally mounted trap door to said hen's nest, the front part of said nest bottom being attached to said trap door and adapted to be slightly lifted by the said trap door, said nest inclosed within a nest house, and said nest house having pivotally mounted inclosing boards at the rear of said nest whereby eggs may be gathered at any time.

3. A hen's nest, including a floor board, a strip-mounted screen nest bottom on said floor board, the front part of said nest bottom made free to be slightly lifted from said floor board, a pivotally mounted trap door to said hen's nest, the front part of said nest bottom being attached to said trap door and adapted to be slightly lifted by the said trap door, said nest inclosed within a nest house designed to receive, support and contain a multiple of said nests, said nests arranged in one or more tiers, the nests in each tier alternately fronting the opposite side of said house, and said nest house provided with perch bars and door openings whereby hens may readily gain entrance to said nests.

4. A hen's nest, said nest inclosed within a nest house designed to receive, support and contain the same, said nest including a floor board, a strip-mounted screen bottom on said floor board, the front part of said screen bottom being made free to be slightly lifted from said floor board, a pivotally mounted L-shaped trap door to said hen's nest, the front part of said screen bottom being attached to and slightly lifted by said L-shaped trap door, and said slightly lifted screen bottom designed to close said L-shaped trap door by the weight of a hen when she enters said nest and steps on said slightly lifted screen bottom.

5. A hen's nest, said nest being inclosed within a nest house designed to receive, support and contain the same, said nest including a floor board, a strip-mounted screen bottom on said floor board, the front part of said screen bottom being made to be slightly lifted from said floor board, a pivotally mounted L-shaped trap door to said hen's nest, the front part of said screen bottom being attached to and slightly lifted by said L-shaped trap door, and said trap door being provided with a detachable U-shaped standard to hold said door fixed when closed by a hen after entering said nest, as described and for the purpose set forth.

CHARLES Z. SHALLIT.